United States Patent [19]

Miller et al.

[11] 4,191,061

[45] Mar. 4, 1980

[54] SOLENOID-OPERATED FUEL FLOW CONTROL FOR FUEL INJECTION SYSTEM

[75] Inventors: Wayne R. Miller; David D. Latham; Joseph C. Spencer, all of Dubuque, Iowa

[73] Assignee: Deere & Company, Moline, Ill.

[21] Appl. No.: 914,349

[22] Filed: Jun. 12, 1978

[51] Int. Cl.² .............................................. F16H 21/44

[52] U.S. Cl. ...................................... 74/108; 361/210

[58] Field of Search ................. 74/105, 102, 108, 526; 361/189, 210; 292/144, 201

[56] References Cited

U.S. PATENT DOCUMENTS

| | | | |
|---|---|---|---|
| 1,307,243 | 6/1919 | Cousins | 74/108 X |
| 3,233,064 | 2/1966 | Blomquist | 361/210 X |
| 3,254,660 | 6/1966 | Ray | 74/105 X |
| 3,576,473 | 4/1971 | Genbouffe | 361/210 |

FOREIGN PATENT DOCUMENTS

| | | | |
|---|---|---|---|
| 184507 | 3/1907 | Fed. Rep. of Germany | 175/320 |

*Primary Examiner*—Richard E. Moore

[57] ABSTRACT

A fuel flow control lever is pivotably mounted for movement between fuel-off and fuel-on positions wherein it respectively engages first and second stops. A solenoid has its plunger linked to the control lever and when the solenoid is deenergized, a spring acting on the plunger holds the latter in an extended position wherein it holds the lever in its fuel-off position. A pair of coils surround the plunger and are selectively simultaneously energizable to retract the plunger to effect movement of the lever to its fuel-on position. The linkage between the plunger and lever is yieldable and the lever reaches its fuel-on position prior to the plunger becoming fully retracted. Upon the plunger becoming fully retracted, a normally closed switch is opened to de-energize one of the coils.

8 Claims, 4 Drawing Figures

FIG. 1
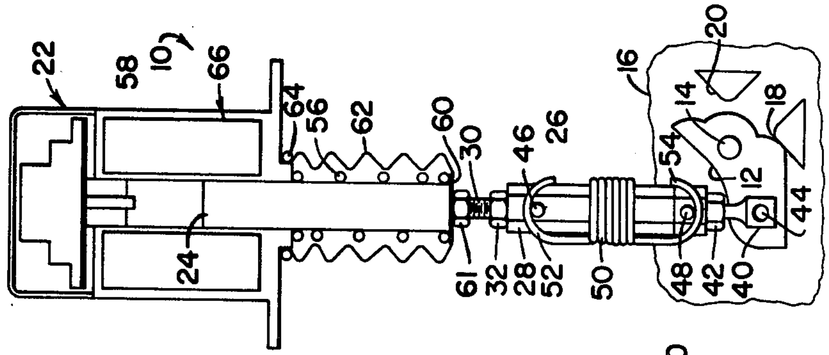
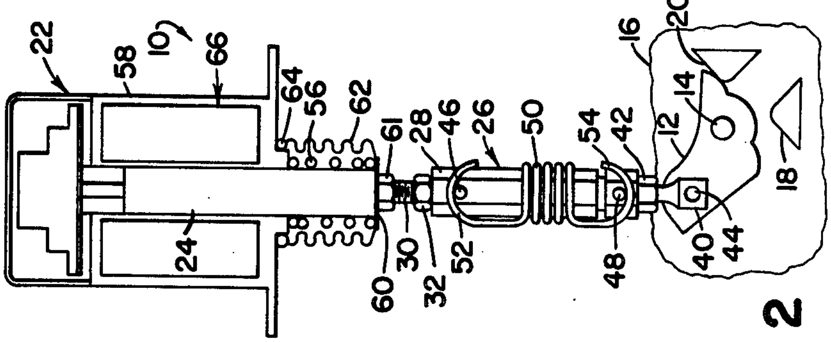
FIG. 2
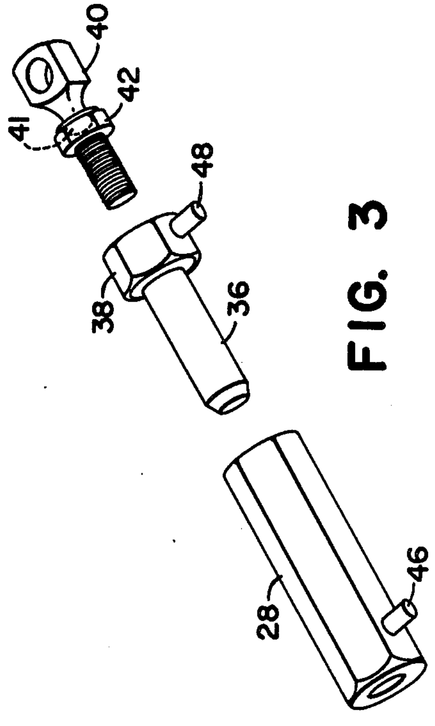
FIG. 3
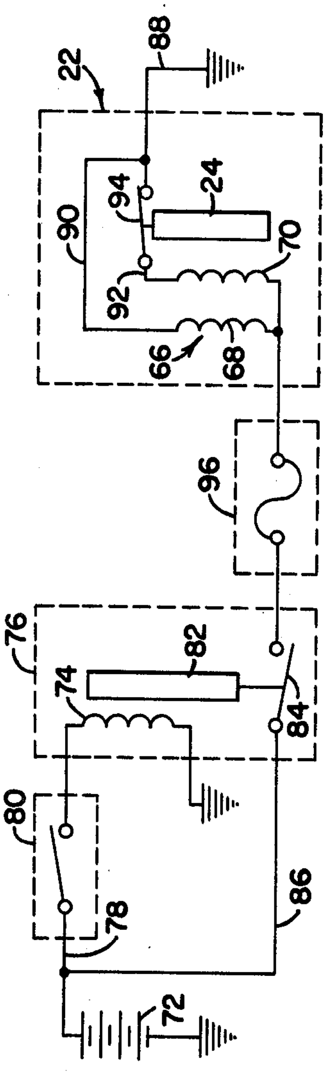
FIG. 4

SOLENOID-OPERATED FUEL FLOW CONTROL FOR FUEL INJECTION SYSTEM

BACKGROUND OF THE INVENTION

This invention relates to fuel injection systems for internal combustion engines and more particularly relates to controls for moving fuel flow control levers of fuel injection pumps between fuel-on and fuel-off positions.

One of the functional requirements of a fuel injection system employing a flow control lever is that the lever must be securely maintained in its fuel-on positions in order to assure that full fuel flow will consistently be available for being delivered to the engine. Heretofore, linkages provided for actuating the flow control levers have suffered one or more of the drawbacks of being difficult to manufacture to the tolerances necessary for or of requiring relatively frequent and sensitive adjustments to be made for meeting the above-noted functional requirement and of requiring the engine to be present for assembly.

SUMMARY OF THE INVENTION

According to the present invention, a novel control is provided for moving a fuel flow control lever between fuel-off and fuel-on positions.

A broad object of the invention is to provide a control which is relatively simple to manufacture, assemble and adjust and which operates to ensure that the fuel flow control lever will be maintained in its fuel-on position during normal operation with the fuel injection pump supplying fuel to the engine.

Another object of the invention is to provide a control including a solenoid having a plunger surrounded by a pair of coils and linked to the fuel flow control lever, the pair of coils being selectively simultaneously energizable to retract the plunger and effect movement of the lever to its fuel-on position, with one coil then becoming de-energized.

A further object of the invention is to provide a control including a resilient yieldable linkage connected to the fuel flow control lever and operable to move the lever against a stop at the fuel-on position, the linkage then continuing on to an overtravel position wherein it becomes yielded and exerts a biasing force urging the lever against the stop. Specifically it is an object to provide such a linkage which comprises a pair of telescopically interconnected members having a tension spring extending therebetween.

These and other objects will become apparent from a reading of the ensuing description together with the appended drawing.

BRIEF DESCRIPTION OF THE DRAWING

FIG. 1 is a side elevational view of a solenoid-operated control for a fuel flow control lever with parts shown in section and with the solenoid shown in a de-energized condition.

FIG. 2 is a view similar to FIG. 1 but showing the solenoid in an energized condition.

FIG. 3 is an exploded perspective view of the length-adjustable, telescopic link shown connected between the solenoid and control lever in FIGS. 1 and 2.

FIG. 4 is a schematic of the electrical circuit for controlling the solenoid.

DESCRIPTION OF THE PREFERRED EMBODIMENT

Referring now to FIGS. 1 and 2, therein is shown a fuel flow control system 10 including a fuel flow control lever 12 fixed to a shaft 14 which is journalled in a housing 16 and defines an axis about which the lever 12 is pivotable between a fuel-off position (FIG. 1), where it engages a fuel-off stop 18, and a fuel-on position (FIG. 2), where it engages a fuel-on stop 20.

Movement of the lever 12 between its fuel-off and fuel-on positions is effected by means of a selectively energizable solenoid 22 having an extendable and retractable plunger 24 connected to the lever 12 by means of a resiliently yieldable linkage 26.

As viewed in FIGS. 1 and 2, but also considering FIG. 3, it can be seen that the linkage 26 is a multipart assembly comprising an upper hexagonal rod 28 having a threaded hole (not shown) extending axially into the top thereof and receiving a threaded rod 30 formed by a reduced bottom end portion of the plunger 24 and held in place by a lock nut 32. Thus, the linkage 26 may be easily lengthened or shortened for properly controlling the lever 12 by loosening the lock nut 32 and turning the rod 28 onto or off the threaded rod 30 and retightening the nut 32. A smooth axial bore (not shown) extends upwardly in the bottom of the rod 28 and telescopically receives a cylindrical upper end portion 36 of a lower hexagonal rod 38. A swivel 40 has a rounded end 41 universally received in a socket formed in the lower end of a special cap screw 42 threadedly received in a threaded bore (not shown) extending axially upwardly in the lower end of the rod 38. A pin 44 is received in the eye of the bolt 40 and serves to pivotally connect the lower end of the linkage 26 to the fuel flow control lever 12. The upper and lower hexagonal rods 28 and 38 respectively have pins 46 and 48 fixed to a projecting from respective sides thereof and a helically wound tension spring 50 encircles the rods 28 and 38 and has hooks 52 and 54 respectively formed at its upper and lower ends and received over the pins 46 and 48. The length of the spring 50 is such that it occupies an unextended position (FIG. 1) when the plunger 24 is extended.

When the solenoid 22 is de-energized, the plunger 24 is yieldable held in its extended position by means of a helically wound compression spring 56 encircling the plunger 24 and compressed between a lower end of a housing 58 of the solenoid and a washer 60 fixed between a nut 61 and a shoulder of the plunger 24. The washer 60 forms the bottom of a flexible boot 62 having a ring 64 at its upper end fixed to the housing 58 such as to prevent dust from entering the solenoid housing along a path defined by the clearance between the plunger 24 and the housing 58.

For the purpose of retracting the plunger 24 to its retracted position (FIG. 2), the solenoid includes an energizable coil assembly 66 located in the housing 58 in encircling relationship to the plunger and operable when energized to retract the plunger. Referring now to FIG. 4, it can be seen that the coil assembly 66 includes main and pull-in coils 68 and 70, respectively. The electrical circuit for controlling energization and de-energization of the coils 68 and 70 includes a battery 72 connected to a coil 74 of a relay 76 via a lead 78 which contains an ignition switch 80. A plunger 82 of the relay 76 is connected to a normally-open switch 84, located in a power lead 86 connected between the battery and the solenoid coils 68 and 70, and operates when the coil 74 is energized, to close the switch 84 to energize the lead 86. The solenoid coils 68 and 70 are connected to the lead 86 in parallel with each other and are connected to a ground lead 88 by respective leads 90 and 92. The lead 92 contains a normally closed switch 94 located in the solenoid housing 58 above the plunger 24 for being engaged and opened thereby when the plunger is completely retracted. Thus it will be appreciated that upon the ignition switch 80 being closed the coils 68 and 70 of the solenoid 22 will be energized to retract its plunger 24 to effect movement of the fuel flow control lever 12 between its fuel-off and fuel-on positions and that upon the plunger becoming fully retracted the switch 94 will be opened to de-energize the pull-in coil 70 leaving only the main coil 68 to maintain the plunger 24 in its retracted position. If for some reason the plunger 24 fails to fully retract and de-energize the coil 70, a fuse 96 located in the power lead 86 will "burn out" and effect de-energization of the solenoid 22 resulting in the plunger 24 being extended by the spring 56 to move the lever 12 to its fuel-off position to disable the engine.

The linkage 26 will normally be adjusted such that the fuel flow control lever 12 will contact the fuel-on stop 20 before the plunger 24 becomes fully retracted. The tensile force exerted by the spring 50 is less than that required for moving the lever 12 from its fuel-off to its fuel-on position and consequently the spring remains unextended and yieldably holds the rods 28 and 38 in a collapsed condition until the lever engages the fuel-on stop 20. The force capability of the solenoid 22 is greater than the spring tensile force and accordingly once the lever 12 engages the stop 20 further retraction or overtravelling of the plunger 24 results in the rods 28 and 38 becoming extended against the force of the spring 50, which also becomes extended as shown in FIG. 2. In this way it is ensured that the lever 12 will be securely held in its fuel-on position against the fuel-on stop to assure full fuel flow to the engine. Further, this overtravel feature eliminates the need for maintaining close manufacturing tolerances or the need to make precise adjustments after installation.

It is of importance to note that the solenoid 22 and linkage 26 comprise a compact unit which may be completely assembled before being installed on an engine and that after installation proper adjustment can quickly be made.

The operation of the system 10 is thought to be clear from the foregoing and for the sake of brevity no further description of the operation is given.

We claim:

1. A solenoid-operated fuel flow control for a fuel injection system, comprising: first and second closely spaced stops; a fuel flow control lever pivotally mounted adjacent said stops for movement between a fuel-off position, wherein it engages the first stop, and a fuel-on position wherein it engages the second stop; a solenoid including a shiftably mounted plunger surrounded by first and second coils which are energizable to move the plunger to a retracted position and biasing means urging the plunger to an extended position which it occupies when the coils are de-energized; linkage means connecting the plunger to the fuel flow control lever for moving the latter from its fuel-off to its fuel-on position when the first and second coils are energized to effect retraction of the plunger; electrical control circuit means connected to the first and second coils for selectively effecting simultaneous energization thereof to, in turn, effect retraction of the plunger; and said electrical circuit means including a normally closed switch for completing a circuit to the second coil and operable to be opened in response to said plunger reaching its retracted position, whereby only the first coil remains energized to hold the plunger in its retracted position.

2. The solenoid-operated fuel flow control defined in claim 1, wherein said normally closed switch is located for being engaged and opened by the plunger upon the latter reaching its retracted position.

3. A solenoid-operated fuel flow control for a fuel injection system, comprising; first and second closely spaced stops; a fuel flow control lever pivotally mounted for movement between a fuel-off position, wherein it engages the first stop, and a fuel-on position, where it engages the second stop; a solenoid having an extendable and retractable plunger surrounded by coil means and movable from a fully-extended to a fully-retracted position only upon said coil means being energized; biasing means urging said plunger toward its fully-extended positon; a resiliently yieldable linkage connecting the plunger to the lever and being in an un-yielded first condition holding the lever in its fuel-off position when the plunger is fully-extended and being in a yielded second condition biasingly holding the lever in its fuel-on position against the second stop when the plunger is fully-retracted, whereby it is ensured that the plunger travel will be sufficient to move the lever to its fuel-on position even after wear occurs without making any compensating adjustments.

4. The solenoid-operated fuel flow control defined in claim 3 wherein said linkage includes a telescoping member having one end fixed to the plunger and another end pivotally connected to the lever and a tension spring connected to the member and biasing it toward a collapsed condition.

5. The solenoid-operated fuel flow control defined in claim 3, wherein said linkage is length-adjustable.

6. The solenoid-operated fuel flow control defined in claim 4, wherein said telescoping member is length-adjustable.

7. The solenoid-operated fuel flow control defined in claim 3 wherein said coil means comprises first and second coils; an electrical control circuit means connected to the first and second coils for selectively simultaneously energizing the latter for moving the plunger from its fully-extended to its fully-retracted position, and said control circuit means including a normally closed position-responsive switch for completing a circuit to the second coil but being opened in response to the plunger reaching its fully-retracted position, whereby the first and second coils are both energized to effect movement of the fuel flow control lever to its fuel-on position but only the first coil remains energized to retain it there.

8. The solenoid-operated fuel flow control defined in claim 7, wherein said normally closed switch is located for being engaged and opened by the plunger upon the latter reaching its fully-retracted position.

* * * * *